(12) United States Patent
Ou

(10) Patent No.: US 7,819,387 B2
(45) Date of Patent: Oct. 26, 2010

(54) HEIGHT ADJUSTABLE STAND FOR NOTEBOOK COMPUTER

(76) Inventor: Chio Lin Ou, No. 9-9, Jensing Lane, Funan Village, Fushing, Changhua (TW)

( * ) Notice: Subject to any disclaimer, the term of this patent is extended or adjusted under 35 U.S.C. 154(b) by 104 days.

(21) Appl. No.: 12/174,641

(22) Filed: Jul. 17, 2008

(65) Prior Publication Data

US 2010/0012815 A1   Jan. 21, 2010

(51) Int. Cl.
*B60P 1/48* (2006.01)
(52) U.S. Cl. .............. 254/10 C; 254/131; 248/371; 414/498
(58) Field of Classification Search .......... 248/676, 248/678, 188.1, 188.2, 188.8, 346.01, 346.05, 248/917, 919, 922, 923, 370, 371, 274.1
See application file for complete search history.

(56) References Cited

U.S. PATENT DOCUMENTS

| | | | | |
|---|---|---|---|---|
| 388,516 A * | 8/1888 | Wilson | ............... | 254/10 C |
| 908,689 A * | 1/1909 | McVey | ............... | 297/7 |
| 1,129,775 A * | 2/1915 | Anthony | ............... | 254/10 C |
| 3,202,304 A * | 8/1965 | Lannen | ............... | 414/498 |
| 3,599,817 A * | 8/1971 | Bargman, Jr. | ............... | 414/498 |
| 5,979,878 A * | 11/1999 | Blankenship | ............... | 254/131 |
| 6,637,351 B1 * | 10/2003 | Brennan et al. | ............... | 108/54.1 |
| 7,264,215 B2 * | 9/2007 | Niehoff | ............... | 248/371 |
| 2007/0221817 A1 * | 9/2007 | Chen | ............... | 248/676 |

* cited by examiner

*Primary Examiner*—J. Allen Shriver, II
*Assistant Examiner*—Alaeddin Mohseni

(57) ABSTRACT

A stand structure includes a stand having two side walls; and two actuation mechanisms comprising an assembly for lifting and pushing the stand and a link pivotably interconnecting the assembly for lifting and pushing the stand and either side wall, and a bent member having a handle, the bent member being adapted to pivotably interconnect the assembly for lifting and pushing the stand and either side wall. Pivoting the handle in a first direction will lift the stand a first predetermined distance and push the stand a second predetermined distance. The invention can increase a space below the stand significantly so as to effectively dissipate heat when a notebook computer placed upon the stand is in use.

1 Claim, 6 Drawing Sheets

HEIGHT ADJUSTABLE STAND FOR NOTEBOOK COMPUTER

BACKGROUND OF THE INVENTION

1. Field of Invention

The invention relates to notebook computer stands and more particularly to such a stand assembly having a height adjustable mechanism in order to facilitate heat dissipation of a notebook computer rested thereon by lifting the stand to increase a space below the stand by pivoting a handle in use.

2. Description of Related Art

Notebook computers are gaining popularity worldwide. Many people use notebook computers as the most important device of a so-called mobile office.

It is known that substantial heat is generated by a notebook computer in use. Internal fan of a notebook computer may partially solve the heat dissipation problem. Hence, how to effectively dissipate heat generated by a notebook computer in use has been an issue to be solved. A number of stands for notebook computer are commercially available. However, their uses are not convenient and further their heat dissipation feature is poor. Thus, the need for improvement still exists.

SUMMARY OF THE INVENTION

It is therefore one object of the invention to provide a stand assembly having a height adjustable mechanism in order to facilitate heat dissipation of a notebook computer rested thereon by lifting the stand to increase a space below the stand by pivoting a handle.

The above and other objects, features and advantages of the invention will become apparent from the following detailed description taken with the accompanying drawings.

DETAILED DESCRIPTION OF THE INVENTION

Figure 1:
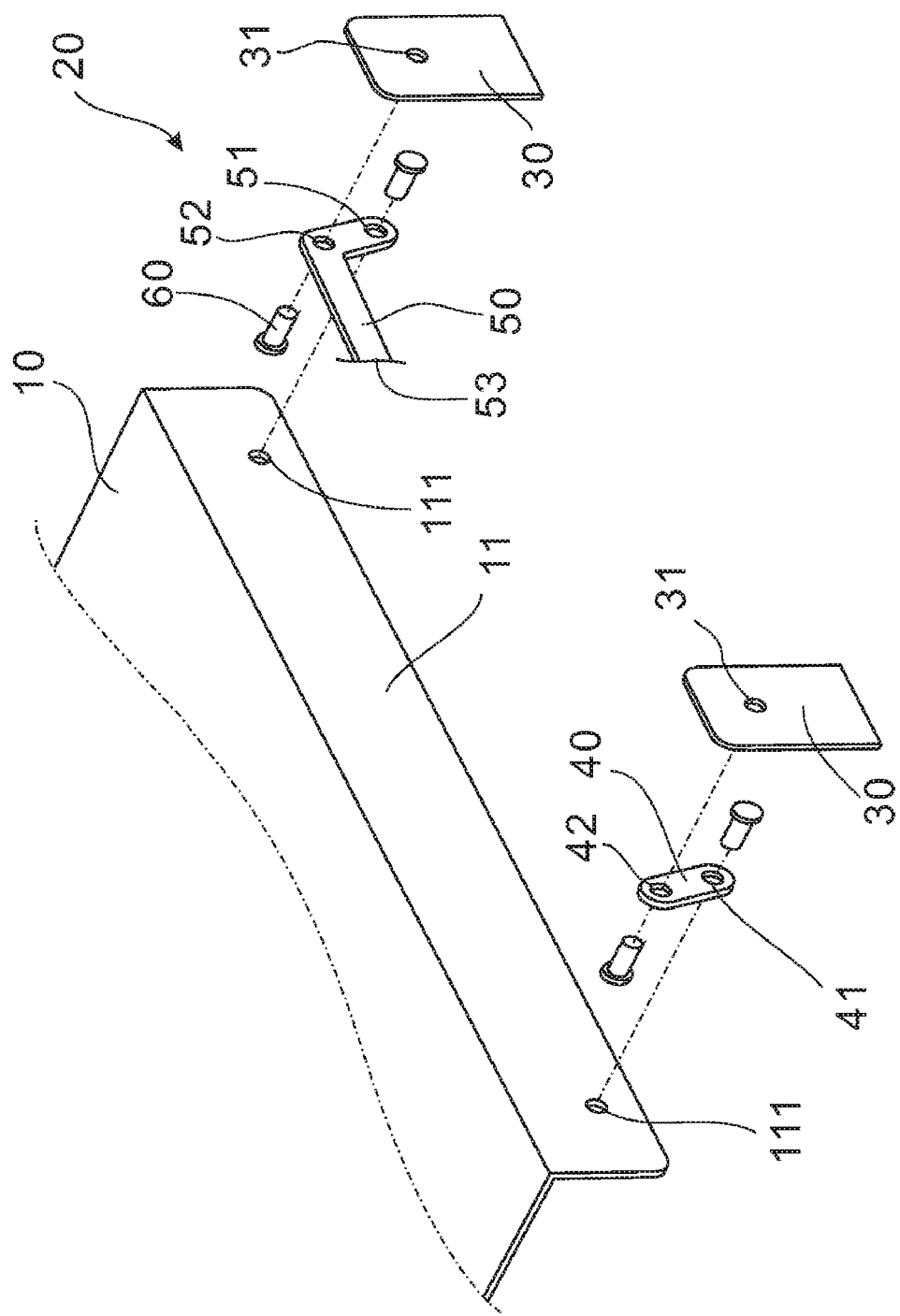
FIG. 1 is a fragmentary exploded view of a first preferred embodiment of stand assembly for notebook computer according to the invention.
Figure 2:
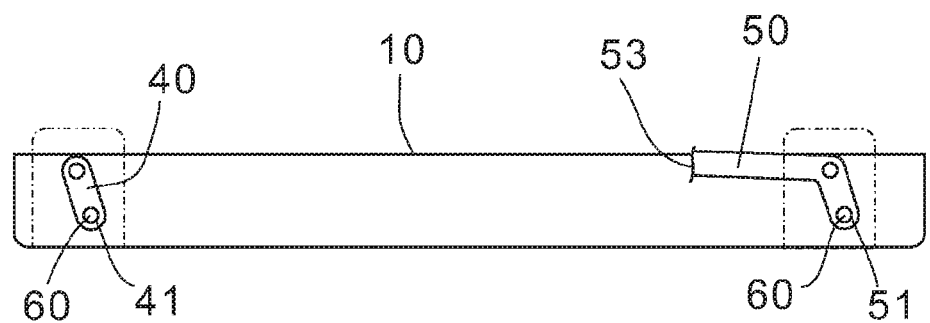
FIG. 2 is a side elevation of the assembled stand assembly in an inoperative position.
Figure 3:
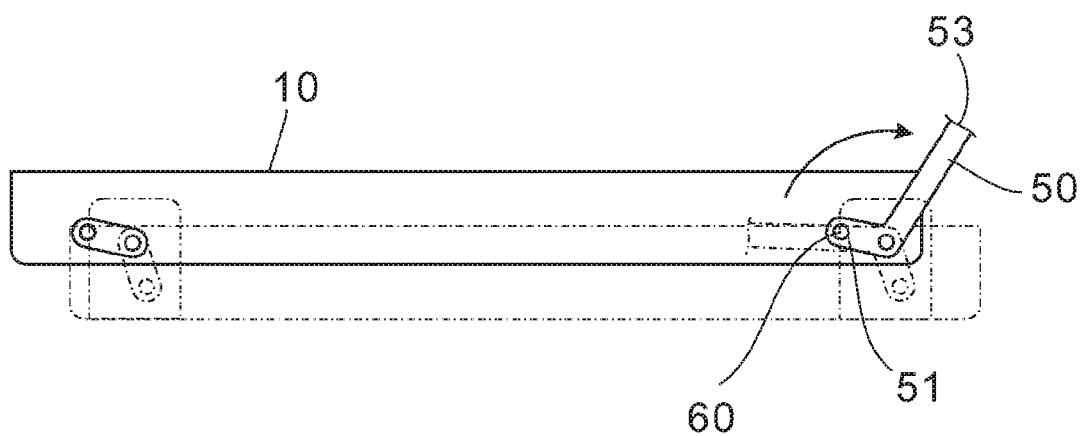
FIG. 3 is a view similar to FIG. 2 where the handle has been pivoted clockwise to lift the stand assembly and push forward same.

Referring to FIGS. 1 to 3, a stand assembly in accordance with a first preferred embodiment of the invention comprises the following components as discussed in detail below.

A stand 10 of inverted U has two spaced holes 111 on either side wall 11. Two actuation mechanisms 20 each is mounted on either side wall 11 of the stand 10.

At either side of the stand 10, the actuation mechanism 20 comprises two rectangular plates 30 having a hole 31; a flat, elongated link 40 having a first through hole 41 proximate one end and a second through hole 42 proximate the other end; a bent member 50 having one section 53 as a handle 53 and the other section as a link having a first through hole 51 proximate one end and a second through hole 52 at the joining portion of the two sections; and a plurality of (e.g., four pins) 60.

A first pin 60 is pivotably driven through the second through hole 52 into the hole 31 of one plate 30, a second pin 60 is pivotably driven through the first through hole 51 into one hole 111, a third pin 60 is pivotably driven through the second through hole 42 into the hole 31 of the other plate 30, and a fourth pin 60 is pivotably driven through the first through hole 41 into the other hole 111. As a result, the side wall 11 and the bent member 50 are pivotably secured together, the bent member 50 and one plate 30 are pivotably secured together, the side wall 11 and the link 40 are pivotably secured together, and the link 40 and the other plate 31 are pivotably secured together.

The bottoms of the side walls 11 of the stand 10 and the plates 30 are flush and are rested upon a support surface (e.g., desk (not shown)) as shown in FIG. 2. In use (see FIG. 3) an individual may pivot the handle 53 (i.e., the bent member 50) clockwise until being stopped. The side wall 11 is pushed forward a small predetermined distance by the link of the bent member 50 after the pivotal rotation of the bent member 50. The link 40 is thus clockwise pivoted about the second through hole 42 due to the forward movement of the side wall 11. As an end, the stand 10 is lifted above the support surface a predetermined distance. As a result, a space below the stand 10 is increased significantly so as to sufficiently dissipate heat. Preferably, the lifted predetermined distance is about half the height of the plate 30.

Figure 4:
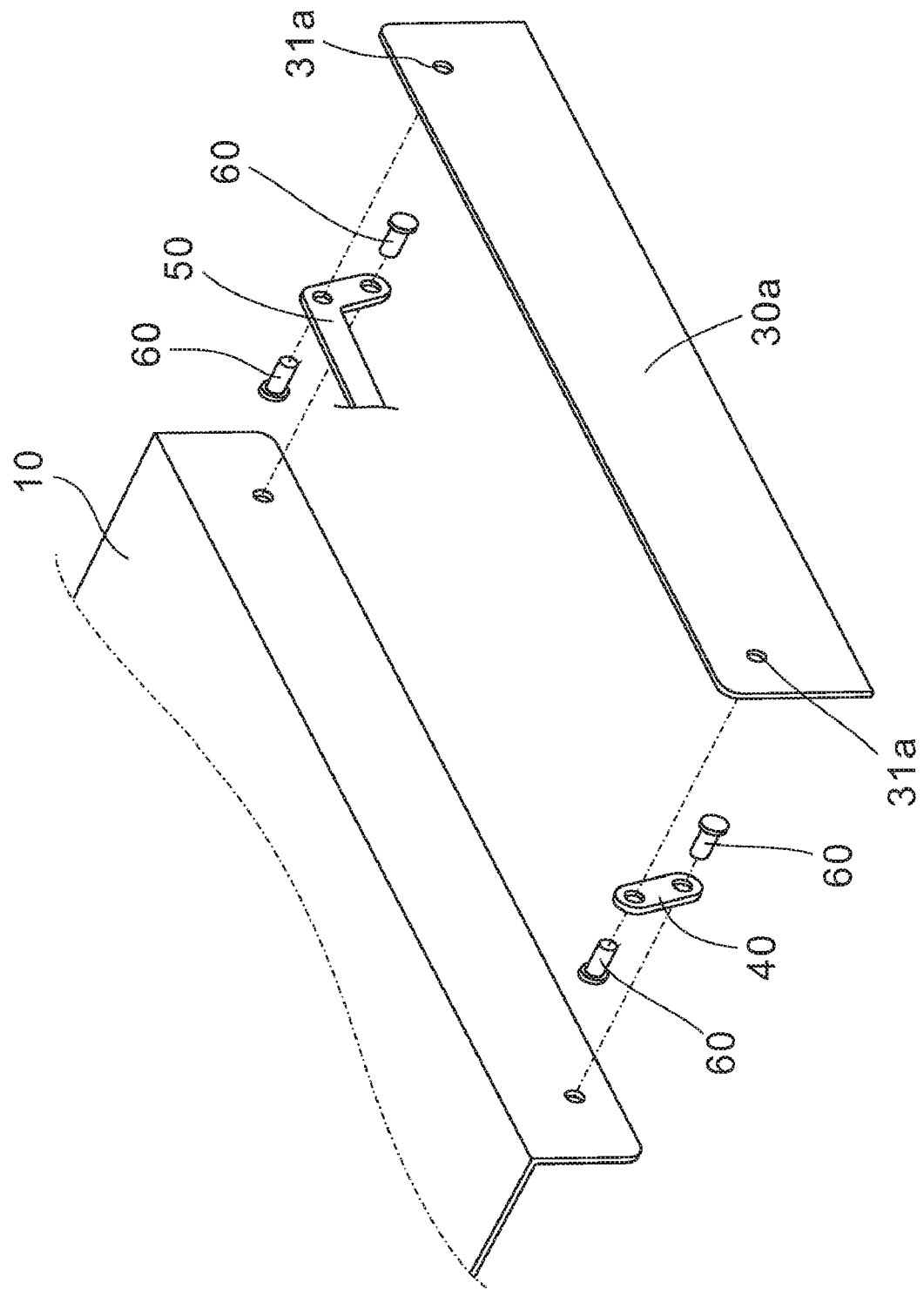
FIG. 4 is a fragmentary exploded view of a second preferred embodiment of stand assembly for notebook computer according to the invention.
Figure 5:
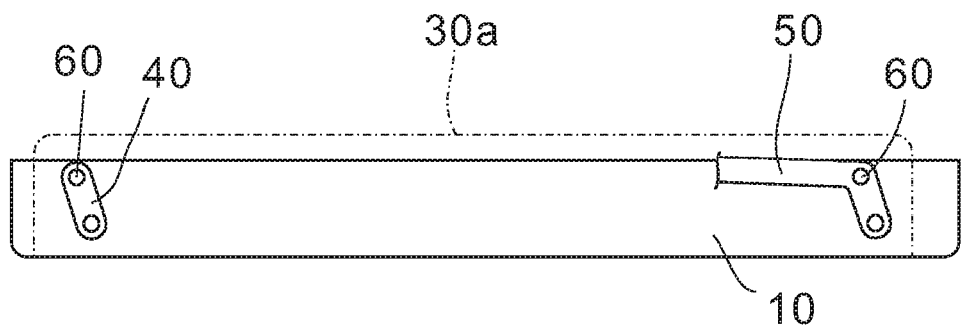
FIG. 5 is a side elevation of the assembled stand assembly of FIG. 4 in an inoperative position.
Figure 6:
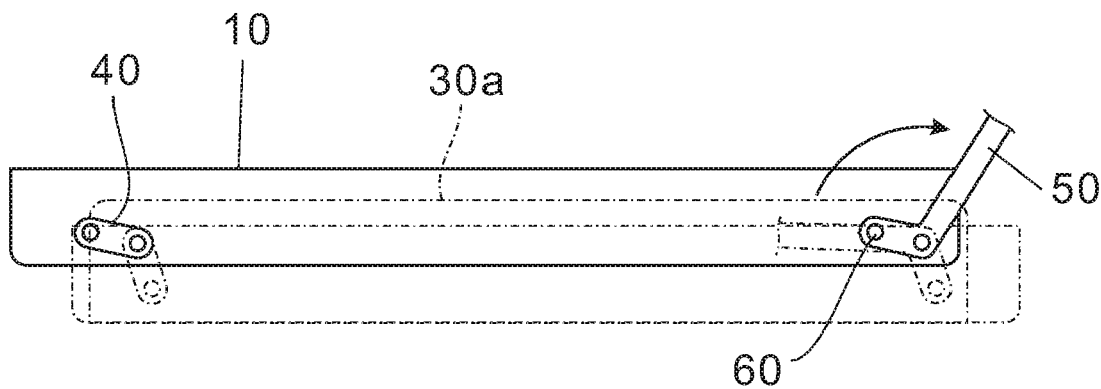
FIG. 6 is a view similar to FIG. 5 where the handle has been pivoted clockwise to lift the stand assembly and push forward same.

Referring to FIGS. 4 to 6, a stand assembly in accordance with a second preferred embodiment of the invention is shown. The second embodiment is identical to the first embodiment, except that the plates 30 of the first embodiment are replaced by a rectangular plate 30a having front and rear holes 31a.

The bottoms of the stand 10 and the plate 30a are flush and are rested upon a support surface (e.g., desk (not shown)) as shown in FIG. 5. In use an individual may pivot the handle of the bent member 50 clockwise until being stopped to lift the stand 10 above the support surface a predetermined distance and push the stand 10 forward a small predetermined distance due to the pivotal interconnections of the plate 30, the stand 10, the link 40, and the bent member 50 as shown in FIG. 6. As a result, a space below the stand 10 is increased significantly so as to sufficiently dissipate heat. Preferably, the lifted predetermined distance is about half the height of the plate 30a.

Figure 7:
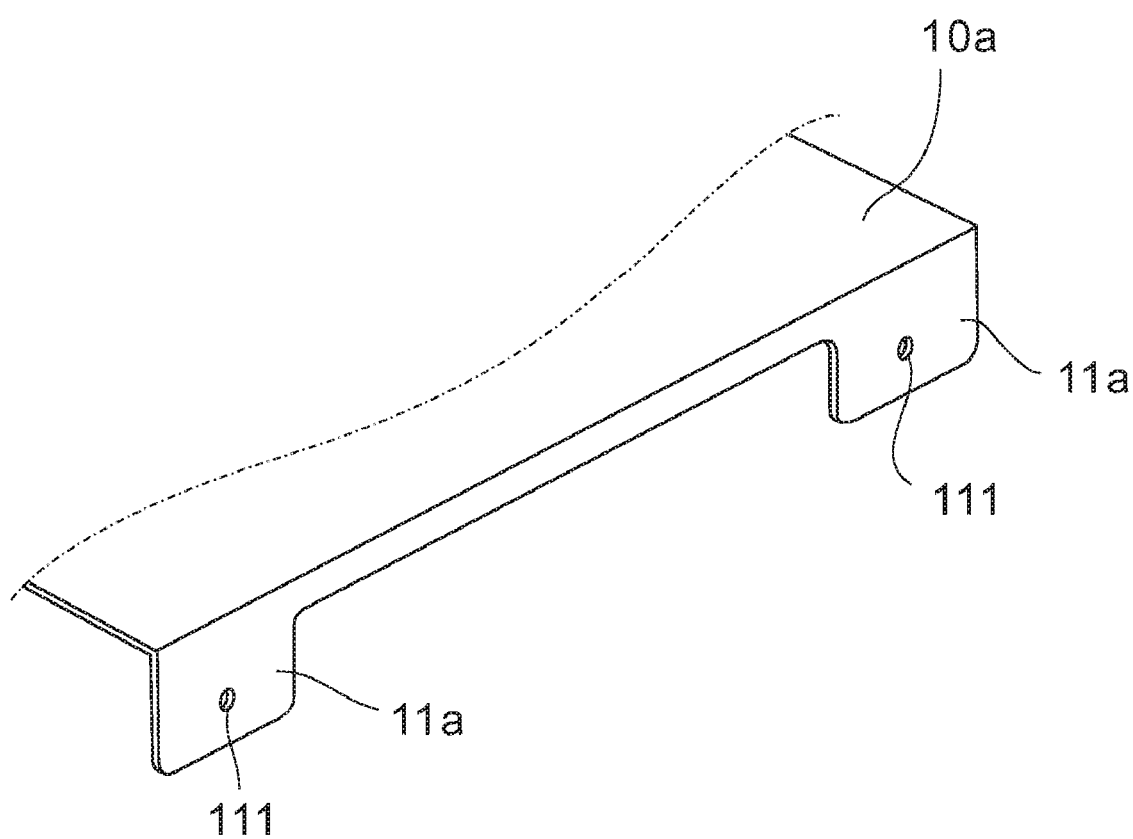
FIG. 7 is a fragmentary perspective view of another configuration of the stand of either embodiment.

Referring to FIG. 7, another configuration of the stand 10a of either embodiment is shown. The stand 10a has two rectangular legs 11a on either side, each leg 11a having a through hole 111. That is, a rectangular recess is formed on either side wall of the stand 10a.

Figure 8:
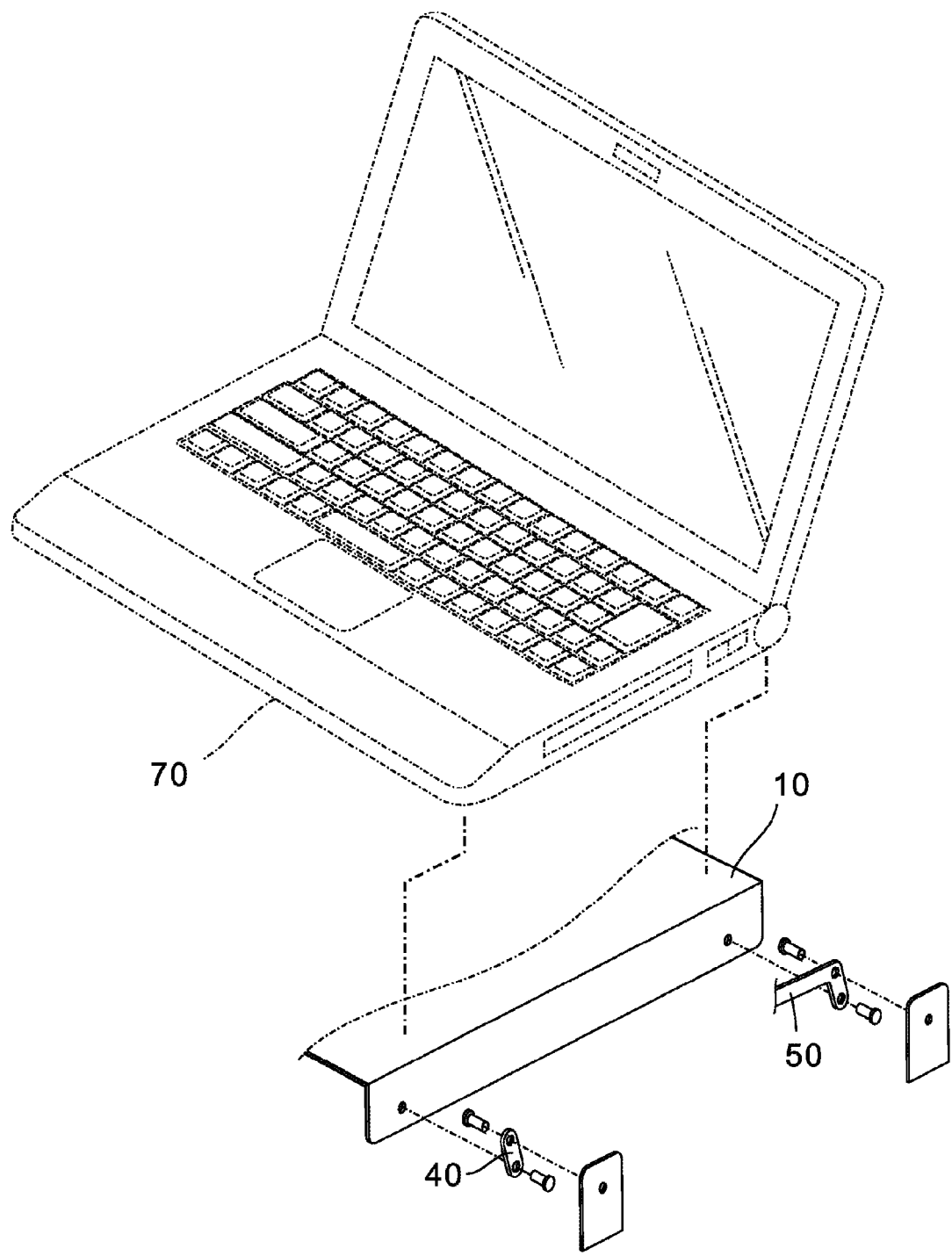
FIG. 8 is a view similar to FIG. 1 showing a notebook computer to be mounted on the stand.

Referring to FIG. 8, it shows a notebook computer 70 to be mounted on the stand 10.

It is envisaged by the invention that a sufficient heat dissipation can be effected by the stand assembly of either embodiment of the invention.

While the invention herein disclosed has been described by means of specific embodiments, numerous modifications and variations could be made thereto by those skilled in the art without departing from the scope and spirit of the invention set forth in the claims.

What is claimed is:

1. A stand structure comprising:

a stand having two side walls; and two actuation mechanisms comprising a first rectangular plate, a link pivotably interconnecting the first rectangular plate and either side wall, a second rectangular plate distal the first rectangular plate, and a bent member pivotably interconnecting the second rectangular plate and either side wall;

whereby pivoting the bent members in a first direction will push the side walls toward one end of the stand a first predetermined distance to pivot the links same and lift the stand relative to the first and second rectangular plates a second predetermined distance.

* * * * *